(12) United States Patent
Prentice

(10) Patent No.: US 8,439,613 B1
(45) Date of Patent: May 14, 2013

(54) TOGGLE BOLT DEVICE

(76) Inventor: Derrick D. Prentice, Houma, LA (US)

( * ) Notice: Subject to any disclaimer, the term of this patent is extended or adjusted under 35 U.S.C. 154(b) by 0 days.

(21) Appl. No.: 12/699,139

(22) Filed: Feb. 3, 2010

Related U.S. Application Data

(60) Provisional application No. 61/149,470, filed on Feb. 3, 2009.

(51) Int. Cl.
*F16B 13/04* (2006.01)
*F16B 39/10* (2006.01)

(52) U.S. Cl.
USPC ............................ 411/21; 411/347; 411/121

(58) Field of Classification Search .................... 411/21, 411/347, 348, 349, 549, 551, 552, 553, 120, 411/121
See application file for complete search history.

(56) References Cited

U.S. PATENT DOCUMENTS

| 337,653 A * | 3/1886 | Beisel ............................ 411/120 |
| 499,444 A | 6/1893 | Schumann |
| 1,169,635 A | 1/1916 | Grimes |
| 1,247,621 A | 11/1917 | Bennett |
| 1,520,123 A | 12/1924 | Gillen |
| 2,597,857 A | 5/1952 | Pasty |
| 2,782,672 A | 2/1957 | Davis |
| 2,877,818 A | 3/1959 | Johnson |
| 3,238,834 A | 3/1966 | Appleberry |
| 3,312,138 A | 4/1967 | Cumming |
| 3,389,735 A * | 6/1968 | Katz .............................. 411/120 |
| 3,466,965 A | 9/1969 | McMcarthy |
| 3,946,636 A | 3/1976 | Grey |
| 4,047,462 A | 9/1977 | Hurtig |
| 4,079,655 A | 3/1978 | Roberson, Jr. |
| 4,293,259 A | 10/1981 | Liebig |
| 4,294,570 A | 10/1981 | Mesching |
| 4,453,845 A | 6/1984 | Donan, Jr. |
| 4,534,101 A * | 8/1985 | Rosan, Jr. ....................... 29/432 |
| 4,557,631 A | 12/1985 | Donan, Jr. et al. |
| 4,693,389 A | 9/1987 | Kalen |
| 5,108,240 A | 4/1992 | Liebig |
| 5,304,021 A * | 4/1994 | Oliver et al. ................... 411/121 |
| 5,462,269 A * | 10/1995 | Schroeder et al. ............. 473/483 |
| 5,573,495 A | 11/1996 | Adler |
| 5,702,215 A | 12/1997 | Li |
| 5,865,559 A | 2/1999 | Yang |
| 6,056,489 A | 5/2000 | Keller |
| 6,161,999 A | 12/2000 | Kaye et al. |
| 6,203,260 B1 | 3/2001 | Henline et al. |
| 6,945,760 B2 * | 9/2005 | Gray et al. ..................... 417/417 |
| 7,150,596 B2 * | 12/2006 | Diaz et al. ..................... 411/344 |

(Continued)

FOREIGN PATENT DOCUMENTS

| DE | 1092415 | 11/1960 |
| DE | 1936360 | 5/1970 |
| FR | 1236439 | 3/2001 |

*Primary Examiner* — Flemming Saether
(74) *Attorney, Agent, or Firm* — Garvey, Smith, Nehrbass & North, L.L.C.; Charles C. Garvey, Jr.; Seth M. Nehrbass

(57) ABSTRACT

A fastener apparatus is disclosed that features projecting locking members that extend and retract when a central drive shaft is rotated. The exterior of the connector has a body that is partially threaded to receive a nut so that two structures (eg. flanges, panels, plates, beams, etc.) can be pulled together by tightening the bolt when the locking members are in the extended position. In one embodiment, the shaft can be an eyebolt.

19 Claims, 3 Drawing Sheets

U.S. PATENT DOCUMENTS 7,153,074 B2 * 12/2006 Wei .................................. 411/21
7,540,140 B1 * 6/2009 Diaz et al. .......................... 59/86
7,628,366 B2 * 12/2009 Scott .............................. 248/343
2006/0284437 A1 * 12/2006 Collins et al. ................. 296/37.6

* cited by examiner

TOGGLE BOLT DEVICE

CROSS-REFERENCE TO RELATED APPLICATIONS

Priority of U.S. Provisional Patent Application Ser. No. 61/149,470, filed 3 Feb. 2009, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fasteners. More particularly, the present invention relates to a toggle bolt type fastener that can be used for holding or compressing multiple items together such as structural panels, flanges, or the like. Even more particularly, the present invention relates to an improved fastener device that features an outer body with an inner rotating shaft, rotation of the shaft moving a plurality of locking members between extended and retracted positions or between retracted and extended positions.

2. General Background of the Invention

Many types of fasteners have been patented that are designed to extend through multiple panels or wall members or through a single wall member. Such fasteners are designed to form a connection between multiple panels or between opposing sides of a particular panel or wall. Many of these fasteners are known as toggle bolts. Examples of possibly relevant patents disclosing toggle bolts and related fasteners are listed in the following table, each hereby incorporated herein by reference.

The following U.S. Patents are incorporated herein by reference:

TABLE

| PAT. NO. | TITLE | ISSUE DATE |
|---|---|---|
| 499,444 | Bolt for Attaching Articles To Walls | Jun. 13, 1893 |
| 1,169,635 | Pipe Hanger | Jan. 25, 1916 |
| 1,247,621 | Expansion Bolt | Nov. 27, 1917 |
| 1,520,123 | Toggle Pin | Dec. 23, 1924 |
| 2,597,857 | Plug Fastener | May 27, 1952 |
| 2,782,672 | Lock Pin Having Eccentrically Actuated Plunger and Cooperating Locking Slide Means | Feb. 26, 1957 |
| 2,877,818 | Anchor Bolt with Spring Biased Reaming Plates | Mar. 17, 1959 |
| 3,238,834 | Quick Release Pin | Mar. 08, 1966 |
| 3,312,138 | Expansion Shell for Rock Bolts | Apr. 04, 1967 |
| 3,466,965 | Quick Release Pin | Sep. 16, 1969 |
| 3,946,636 | Toggle Bolt | Mar. 30, 1976 |
| 4,047,462 | Toggle Bolt | Sep. 13, 1977 |
| 4,079,655 | Toggle Bolt | Mar. 21, 1978 |
| 4,293,259 | Locking Toggle Bolt | Oct. 06, 1981 |
| 4,294,570 | Lockable Cap Screw | Oct. 13, 1981 |
| 4,453,845 | Base Thrust Anchor Shell Assembly | Jun. 12, 1984 |
| 4,557,631 | Off-Center Rock Bolt Anchor and Method | Dec. 10, 1985 |
| 4,693,389 | Reactor Internals Core Barrel Hole Plug | Sep. 15, 1987 |
| 5,108,240 | Heavy Load Bearing Toggle Bolt | Apr. 28, 1992 |
| 5,573,495 | Abdominal Wall Elevator Device Employing Rotatable Arms | Nov. 12, 1996 |
| 5,702,215 | Retractable Fixation Device | Dec. 30, 1997 |
| 5,865,559 | Float Pins | Feb. 02, 1999 |
| 6,056,489 | Expansion Dowel | May 02, 2000 |
| 6,161,999 | Toggle Bolt Device | Dec. 19, 2000 |
| 6,203,260 | Toggle Bolt Assembly With Bolt Centering Spacer | Mar. 20, 2001 |
| FR1236,439 | Dispositif de soutenement par bil-broche notamment pour plafonds de galeries de mines | Jun. 07, 1960 |
| DE1092415 | Anke fur den Ankerausbau | Nov. 10, 1960 |
| DE1936360 | | May 1970 |

BRIEF SUMMARY OF THE INVENTION

The present invention provides an improved toggle bolt type device or fastener that can be used to join two members together such as a pair of panels, structures, flanges or the like. For example, the present invention can be used to join two spool pieces with pipe flanges together wherein each of the flanges has an opening of a selected diameter. The fastener of the present invention can extend through the openings for holding or fastening the two flanges together.

The apparatus includes an elongated body having first and second end portions and a central, longitudinal bore that is partially threaded. A first end portion of the body has a socket and a plurality of circumferentially spaced apart, radially extending slots that communicate with the socket.

A shaft extends through the bore of the body and has respective first and second end portions that communicate with the body end portion. The shaft is partially externally threaded and rotates relative to the body. The partially externally threaded portion of the shaft engages an internally threaded portion of the body at the bore. An end portion of the shaft has a handle for rotating the shaft. The handle can be in the form of an eye or eyelet. A collar interlocks with the handle to prevent rotation of the shaft until the collar is disengaged from the handle (see FIG. 3).

A plurality of locking members are attached to the shaft at a first end portion of the body. The locking members can be attached to a plate mounted to the first end portion of the shaft.

The locking members are movable between extended and retracted positions responsive to a rotation of the shaft once the collar is disengaged from the handle. Rotating the shaft in either of two selected direction can either move the locking members from an extended to a retracted position or from a retracted to an extended position.

In the locking position, the locking members extend radially beyond the outer surface of the body and the selected diameter. This enables the projecting, locking members in the extended position to engage one side of a selected member or members to be held together (wall, panels, flanges, etc). A fastener such as a nut is then connectable to the body at a partially externally threaded portion and opposite the locking members. The nut can then be tightened against the locking members so that compression can be applied to the shaft for holding the selected structures, flanges, panels together or for attaching the apparatus to a selected structure (wall, flange, beam, etc).

The apparatus of the present invention can be used to form an attachment to a wall, panel, beam, plate, slab or other structure by inserting the body through an opening in the selected structure when the locking members are retracted and then moving the locking members to an extended position so that they can form an attachment to the selected structure at one end portion of the opening. At the opposite end portion of the opening, the nut can be attached to the body and threadably engaged thereto for supplying compression to the body and for holding and anchoring the entire apparatus into a selected position at the opening.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 4:
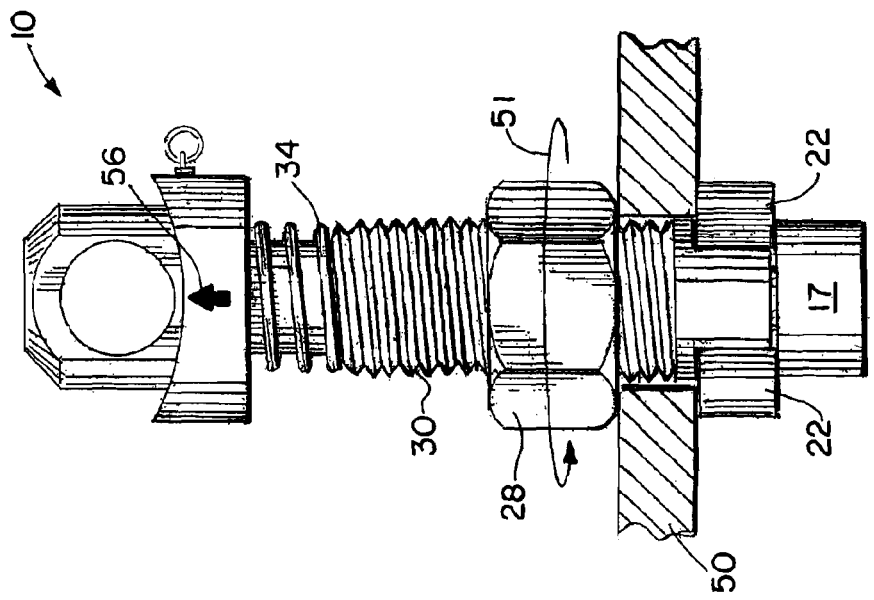
FIG. 4 is an elevation view of the preferred embodiment of the apparatus of the present invention illustrating an attachment to an aperture in the plate.
Figure 3:
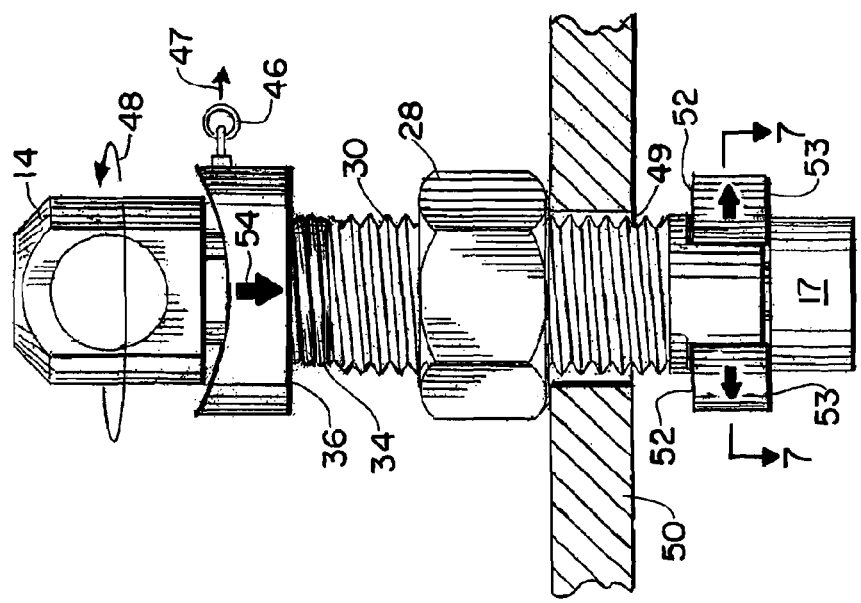
FIG. 3 is an elevation view of the preferred embodiment of the apparatus of the present invention illustrating an extension of the locking members by rotating the eyelet.
Figure 5:
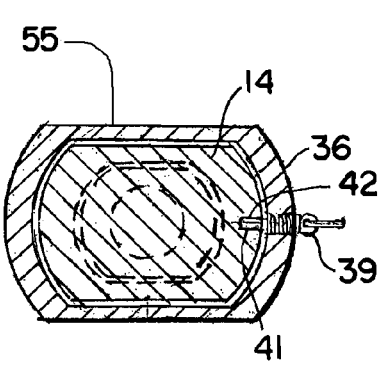
FIG. 5 is a sectional view taken along lines 5-5 if FIG. 2.
Figure 6:
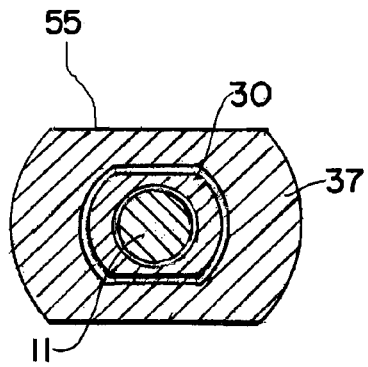
FIG. 6 is a sectional view taken along lines 6-6 of FIG. 2.

FIGS. 1-4 show fastener 10 that can be attached to any opening such as the opening 49 in plate 50 in FIGS. 3-4. Fastener 10 provides a central shaft 11 having an upper end portion 12 and a lower end portion 13. Upper end portion 12 of central shaft 11 provides a head or handle 57 or gripping surface, or other structure that can be for example in the form of an eye or eyelet 14 having an eyelet opening 15.

Figures 1, 2:
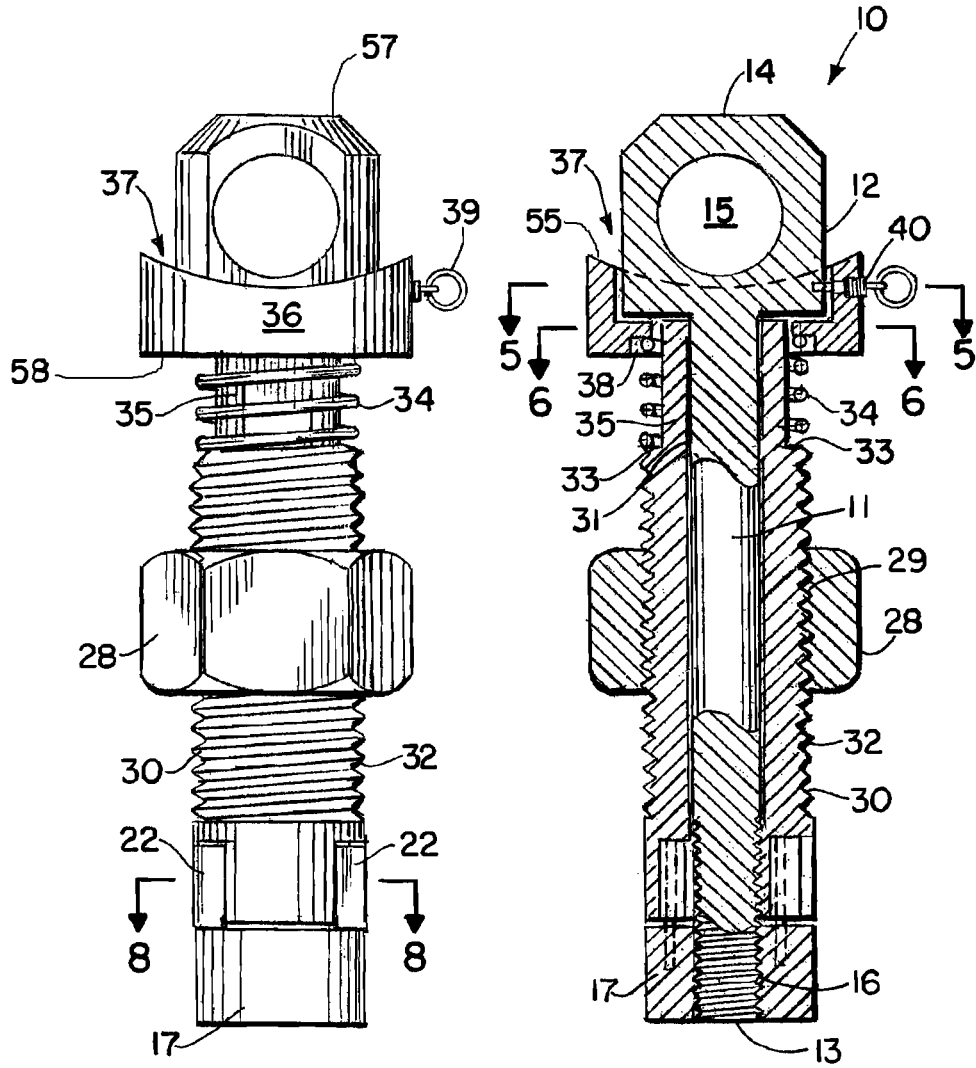
FIG. 1 is a front elevation view of the preferred embodiment of the apparatus of the present invention.
FIG. 2 is a sectional elevation view of the preferred embodiment of the apparatus of the present invention.
Figure 9:
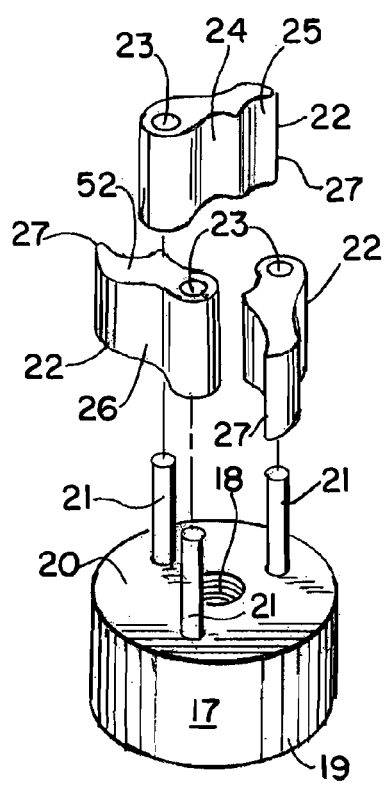
FIG. 9 is a partial perspective exploded view of the preferred embodiment of the apparatus of the present invention.

At lower end portion 13 of central shaft 11 is provided an externally threaded section 16 as shown in FIG. 2. Externally threaded section 16 engages corresponding threads of internally threaded opening 18 of disk or plate 17 as shown in FIGS. 2 and 9.

Disk or plate 17 can provide a generally cylindrically shaped outer wall 19 that is of a diameter that is about equal to the diameter of tool body 30. Plate 17 provides upper surface 20 having a plurality of circumferentially spaced apart pins 21. Each pin 21 extends radially away from internally threaded opening 18. Each pin 21 carries a locking member 22. Each locking member 22 thus has an opening 23 that receives pin 21. Each locking member 22 can pivot about a pin 21.

Figure 7:
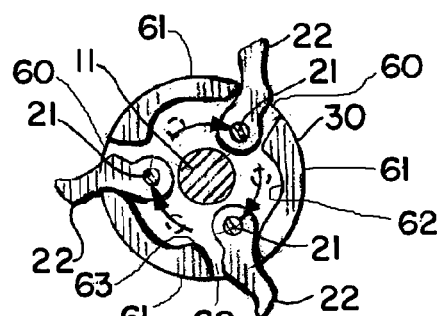
FIG. 7 is a sectional view taken along lines 7-7 of FIG. 3.
Figure 8:
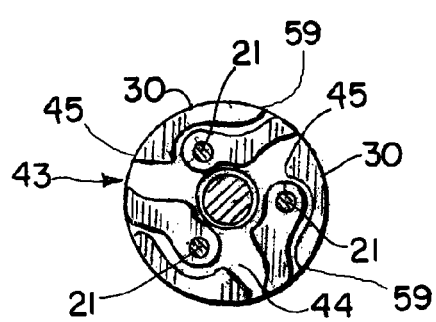
FIG. 8 is a sectional view taken along lines 8-8 of FIG. 1.

Each locking member 22 has a tip end 27 opposite opening 23 and opposed surfaces that have one or more concavities or concave surfaces. In FIG. 9, each locking member 22 has a pair of concavities 24, 25 on one surface and a single concavity 26 on the other surface. The locking members occupy a cavity 43 that can be a milled portion of tool body 30, having wall segments 61 spaced apart with openings 60 therebetween. Each wall segment has end portions or edges 45, 59. Each wall segment can be provided with a concavity 62 and a projecting portion or projection 63 as shown in FIGS. 7-8.

Nut 28 provides an internally threaded opening 29 that enables nut 28 to connect with tool body 30. Tool body 30 has a central open ended bore 31 that is receptive of central shaft 11. Tool body 30 provides an externally threaded section 32 that forms a connection with nut 28 as shown in FIGS. 1, 2, 3, and 4.

Tool body 30 has an upper annular shoulder 33. Coil spring 34 rests against annular shoulder 33. Tool body 30 provides an un-threaded surface 35 that is surrounded by spring 34.

Collar 36 is positioned in between spring 34 and handle or head 57 as shown in FIGS. 1-4. Collar 36 provides a socket 37 that is receptive of head or handle 57. The underside 58 of collar 36 provides an annular recess 38 that is receptive of coil spring 34 as shown in FIG. 2.

Collar 36 and head 57 can be locked together using spring loaded locking pin 39. The locking pin 39 has a spring 40 that urges the pin end 41 into a locking position with socket 42 on head 57 as shown in FIG. 2. This locking position can be overcome by pulling on ring 46 to compress spring 40 and pull pin end 41 away from socket 42 in a releasing position that is indicated by arrow 47 in FIG. 3.

When spring loaded locking pin 39 is moved to the released position of FIG. 3, collar 36 disengages head 57 and can be lowered as indicated by arrow 54 in FIG. 3. Head 57 then can rotate as indicated schematically by arrow 48 in FIG. 3. A rotation of head 57 rotates shaft 11 and plate 17. This rotation of plate 17 likewise rotates pins 21 and the locking members 21 that are attached thereto. As the pins 21 rotate relative to tool body 30, each locking member 22 engages an edge 45.

Continued rotation of the eyelet 14 in shaft 11 urges the locking members 22 to a fully extended position shown in FIG. 7. In this position of FIG. 7, the locking members 22 prevent a removal of tool body 30 from opening 49 of plate 50. Nut 28 can then be tightened as indicated schematically by arrow 51 in FIG. 4. At this point, fastener 10 is secured to plate 50 as nut 28 and locking members 22 compress plate 50 therebetween.

The locking members 22 can be made very thick or tall between surfaces 52, 53, thus fully developing the strength of the fastener 10 so that the "weak" link of the fastener 10 is defined by the diameter and material of shaft 11. Similarly, the plate 17 can be made very thick to fully develop the connection between shaft 11 and plate 17 at the threaded connection of threads 16, 18.

When the head 57 is to be rotated, collar 36 is moved downwardly in the direction of arrow 54. Otherwise, rotation of eyelet 14 is not possible as the eyelet 14 is constrained by the sidewall 55 of the collar 36. When collar 36 is moved downwardly, spring 34 is compressed as shown in FIG. 3. Once a connection has been perfected between fastener 10 and plate 50 as shown in FIG. 4, arrow 56 illustrates a return of collar to its uppermost position responsive to an expansion of spring 34. It should be understood that other force means can be used to urge collar 36 to the upper position shown in FIG. 4, such as magnetism, fluid (pneumatic or hydraulic) or other force. For example, head 57 and/or collar 36 could be magnetized. The entire apparatus 10 could be of steel so that if either head 57 or collar 36 were magnetized, the collar 36 would be urged to the upper position of FIG. 4.

The following is a list of parts and materials suitable for use in the present invention.

| PARTS LIST | |
|---|---|
| Part Number | Description |
| 10 | fastener |
| 11 | central shaft |
| 12 | upper end portion |
| 13 | lower end portion |
| 14 | eyelet |
| 15 | opening |
| 16 | externally threaded section |
| 17 | plate |
| 18 | internally threaded opening |
| 19 | cylindrically shaped wall |
| 20 | upper surface |
| 21 | pin |
| 22 | locking member |
| 23 | opening |
| 24 | concavity |
| 25 | concavity |
| 26 | concavity |
| 27 | tip end |
| 28 | nut |
| 29 | internally threaded opening |
| 30 | tool body |
| 31 | central open ended bore |
| 32 | externally threaded section |
| 33 | annular shoulder |
| 34 | spring |
| 35 | un-threaded surface |
| 36 | collar |
| 37 | socket |
| 38 | annular recess |
| 39 | spring loaded locking pin |
| 40 | spring |
| 41 | pin end |
| 42 | socket |
| 43 | cavity |
| 44 | flat surface |
| 45 | edge |
| 46 | ring |
| 47 | arrow |
| 48 | arrow |
| 49 | opening |
| 50 | plate |
| 51 | arrows |
| 52 | surface |
| 53 | surface |
| 54 | arrow |
| 55 | sidewall |
| 56 | arrow |
| 57 | head/handle |
| 58 | underside |
| 59 | edge |
| 60 | opening |
| 61 | wall segment |
| 62 | concavity |
| 63 | projection |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A fastener apparatus comprising;
an elongated body having first and second end portions and a central, longitudinal bore that is at least partially threaded, the first end portion of the body having a socket and a plurality of circumferentially spaced apart slots that communicate with the socket;
a shaft that extends through the bore and having respective first and second end portions communicating with the body end portions, one end portion having a head, the shaft being at least partially externally threaded opposite the head and the head and shaft being rotatable relative to the body;
a plurality of locking members that are attached to the shaft at a position next to the first end portion of the body, the locking members being attached to the first end portion of the shaft;
the locking members being movable between extended and retracted positions responsive to a rotation of the shaft, the locking members extending radially beyond the outer surface of the body in the extended position and being contained within the body at the socket in the retracted position;
a nut that is connectable to the body at the partially threaded portion;
a collar that is movable between a locked position wherein the collar prevents rotation of the head and an unlocked position wherein the collar is spaced away from the head a distance that enables rotation of the head, wherein in the unlocked position: 1) the head is able to rotate with the shaft and 2) the head does not travel toward the body;
a biasing device that urges the collar toward the locked position.

2. The fastener apparatus of claim 1 wherein there are at least three locking members.

3. The fastener apparatus of claim 1 wherein the locking members have curved outer surfaces.

4. The fastener apparatus of claim 1 wherein the body has curved camming surfaces at the socket that are positioned to guide movement of the locking members as they travel between the extended and retracted positions.

5. The fastener apparatus of claim 1, further comprising a plate attached to the shaft, the locking members being mounted on the plate.

6. The fastener apparatus of claim 5 wherein the shaft has a first threaded portion that connects with the plate and a second threaded portion that engages the body.

7. The fastener apparatus of claim 1 wherein the shaft has a tool receptive portion at one end thereof that enables rotation of the shaft relative to the body.

8. The fastener apparatus of claim 1 wherein the nut engages the body generally opposite the locking members.

9. The fastener apparatus of claim 1 wherein the shaft moves linearly relative to the central longitudinal axis of the body when the shaft is rotated.

10. The fastener apparatus of claim 1 wherein the biasing device is a spring.

11. The fastener apparatus of claim 1 wherein the biasing device includes one or more parts that are magnetized.

12. The fastener apparatus of claim 11 wherein the head is magnetized.

13. The fastener apparatus of claim 11 wherein the collar is magnetized.

14. The fastener apparatus of claim 1 wherein the biasing is positioned in between the collar and the elongated body.

15. The fastener apparatus of claim 1 wherein the head is magnetized.

16. The fastener apparatus of claim 1 wherein the collar is magnetized.

17. A fastener apparatus for joining two members together, each member having an opening therethrough of a selected diameter, comprising;
an elongated body having first and second end portions and a central, longitudinal bore, the first end portion of the body having a socket and a plurality of circumferentially spaced apart, radially extending slots that communicate with the socket;

a shaft that extends through the bore and having respective first and second end portions communicating with the body end portions, one end portion having a head, an eyelet, the other end portion being partially externally threaded, the shaft being rotatable relative to the body, the partially externally threaded a portion of the shaft engaging the threaded portion of the bore;

a plurality of locking members that are attached to the shaft at the first end portion of the body, the locking members being attached to a plate mounted to the first end portion of the shaft;

the locking members being movable between extended and retracted positions responsive to a rotation of the shaft, the locking members extending radially beyond the outer surface of the body and the selected diameter in the extended position and being contained within the body at the socket and inside the selected diameter in the retracted position;

a nut that is connectable to the body at the partially threaded portion;

a collar that is movable between a locked position wherein the collar prevents rotation of the head and an unlocked position wherein the collar is spaced away from the head, wherein in the unlocked position: 1) the head is able to rotate with the shaft and 2) the head does not travel toward the body;

the collar being biased to the locked position by a force transmission device.

18. The fastener apparatus of claim 17 wherein the force transmission device is a spring.

19. The fastener apparatus of claim 17 wherein the force transmission device includes one or more parts that are magnetized.

* * * * *